United States Patent
van den Tillaart et al.

(10) Patent No.: US 6,534,439 B2
(45) Date of Patent: Mar. 18, 2003

(54) CATALYST FOR REDUCING NITROGEN OXIDES IN OXIDIZING AND REDUCING ATMOSPHERES

(75) Inventors: Hans van den Tillaart, Freigericht; Jürgen Leyrer, Rheinfelden; Wolfgang Strehlau, Grosskrotzenburg; Egbert Lox, Hanau; Thomas Kreuzer, Karben; Carsten Plog, Markdorf; Renato Andorf, Meckenbeuren; Norbert Markert, Immenstaad; Thomas Stengel, Friedrichshafen, all of (DE)

(73) Assignee: Degussa-Huls Aktiengesellschaft, Frankfurt am Main (DE)

( * ) Notice: Subject to any disclaimer, the term of this patent is extended or adjusted under 35 U.S.C. 154(b) by 0 days.

(21) Appl. No.: 09/345,787

(22) Filed: Jul. 1, 1999

(65) Prior Publication Data

US 2001/0053341 A1 Dec. 20, 2001

(30) Foreign Application Priority Data

Jul. 4, 1998 (DE) .......................... 198 29 976

(51) Int. Cl.[7] .......................... B01J 23/40; B01J 29/06; B01J 8/02; B01J 8/00; C01B 21/00
(52) U.S. Cl. ................. 502/326; 423/213.2; 423/213.5; 423/239.1; 423/239.2; 502/64; 502/71
(58) Field of Search .............................. 502/64, 26, 71, 502/326; 423/213.2, 213.5, 239.1, 239.2

(56) References Cited

U.S. PATENT DOCUMENTS

| | | | | |
|---|---|---|---|---|
| 5,413,976 A | * | 5/1995 | Takami et al. | 502/66 |
| 5,518,976 A | | 5/1996 | Itoh et al. | 502/66 |
| 5,643,542 A | * | 7/1997 | Leyrer et al. | 423/212 |
| 5,677,254 A | * | 10/1997 | Nojima et al. | 502/65 |
| 5,710,084 A | * | 1/1998 | Nojima et al. | 502/64 |
| 5,801,114 A | * | 9/1998 | Durand et al. | |
| 5,821,190 A | | 10/1998 | Kurabayashi et al. | 502/178 |
| 5,928,981 A | * | 7/1999 | Leyrer et al. | 502/64 |

FOREIGN PATENT DOCUMENTS

| | | | |
|---|---|---|---|
| DE | 19619791 | 5/1996 | |
| EP | 0455491 A2 * | 6/1991 | ........... B01D/53/56 |
| EP | 0633052 B1 | 1/1995 | |
| EP | 0730900 A1 | 9/1996 | |
| EP | 0832688 A1 | 4/1997 | |

OTHER PUBLICATIONS

Zakaria Chajar et al. "Nitrogen dioxide effect in the reduction of nitric oxide by propane in oxidizing atmosphere" Catalyst Letters 28(1994) p. 33–40, 1994.
Abstract, JP7080315 published Mar. 28, 1995 in Japan.
"Selective Reduction of Nitric Oxide over Noble Metals", Taylor et al., Journal of Catalysis 63, 1980, XP002118104 pp. 53–71.
Patent Abstracts of Japan, vol. 199, No. 506, Jul. 31, 1995, JP 07 080315 (Mar. 28, 1995).

* cited by examiner

Primary Examiner—Steven P. Griffin
Assistant Examiner—Jonas N. Strickland
(74) Attorney, Agent, or Firm—Kalow & Springut LLP

(57) ABSTRACT

A catalyst for reducing nitrogen oxides in oxidizing and reducing atmospheres which contains iridium on a support material. Silicon dioxide or a dealuminized zeolite in the acid H form with a modulus of more than 20, preferably more than 100, or mixtures thereof are used as support materials. Iridium is deposited on the external surfaces of these support materials with average particle sizes between 10 and 30 nm. The catalyst is particularly suitable for treating exhaust gases from lean-burn gasoline engines or from diesel engines.

9 Claims, 3 Drawing Sheets

CATALYST FOR REDUCING NITROGEN OXIDES IN OXIDIZING AND REDUCING ATMOSPHERES

INTRODUCTION AND BACKGROUND

The present invention relates to a catalyst for reducing nitrogen oxides in oxidizing and reducing atmospheres. The catalyst contains iridium on a support material.

In a similar manner to diesel engines, it is now being attempted to lower the fuel consumption of modern gasoline engines by also operating them with lean air/fuel mixtures. Fuel savings of up to 25% are expected from so-called lean-burn engines, in particular those with direct gasoline injection, as compared with stoichiometrically operated internal combustion engines. However, lean-burn engines also have operating phases with stoichiometric or so-called rich air/fuel conditions. These types of conditions prevail after a cold-start, when accelerating and when under full load. Diesel engines, which are operated almost exclusively with lean air/fuel mixtures, also belong to the class of lean-burn internal combustion engines.

The catalytic removal of nitrogen oxides contained in the exhaust gas is a substantial problem in the case of lean-burn engines. Due to the high oxygen concentration in the exhaust gas from these engines, up to 15 vol. %, the nitrogen oxides ($NO_x$) contained in the exhaust gas cannot readily be reacted with the hydrocarbons (HC) and carbon monoxide (CO) also contained in a lean exhaust gas on a conventional exhaust gas catalyst, because in this case the reductive components (HC and CO and also small amounts of hydrogen $H_2$) are oxidized directly by oxygen.

Exhaust gas catalysts for the simultaneous conversion of hydrocarbons, carbon monoxide and nitrogen oxides, so-called three-way catalysts, require a stoichiometric composition of exhaust gas, with an oxygen concentration of about 0.7 vol. %, for the conversion to take place. The exhaust gas composition is usually described by the normalized air to fuel ratio λ, which is defined as the air/fuel ratio normalized to stoichiometric conditions. The air/fuel ratio states how may kilograms of air are required for complete combustion of one kilogram of fuel. With conventional fuels, the stoichiometric air/fuel ratio has a value of 14.6, which corresponds to a normalized air/fuel ratio of 1.

Two alternative routes have been described for converting nitrogen oxides in lean exhaust gases. An attempt is made to store the nitrogen oxides in the form of nitrates during lean operation of the internal combustion engine, with the aid of so-called nitrogen oxide storage catalysts. Preferred storage materials for this purpose are, for example, alkaline earth metal oxides, in particular barium oxide. For storage purposes, the nitrogen oxides, between 50 and 90 vol. % of which consists of nitrogen monoxide depending on the type of engine and mode of operation of the engine, first have to be oxidized to nitrogen dioxide before they can form nitrates with the storage materials. Oxidation takes place mainly on the storage catalyst itself and this is provided, for example, with platinum as a catalytically active component for this purpose.

Depending on the driving conditions, the storage material has to be regenerated at certain intervals. For this, the internal combustion engines are operated for brief periods with rich air/fuel mixtures. Under the reductive exhaust gas conditions which then prevail, the nitrates are decomposed and the nitrogen oxides being released are converted into nitrogen, with simultaneous oxidation of the reductive components. The acceleration phases may sometimes be used for regeneration of the storage material. In addition, however, in the absence of acceleration phases, targeted regeneration is required and this has to be achieved by appropriate regulation of the engine. The fuel required for this reduces the theoretical fuel saving when using lean-burn engines.

Current storage catalysts still exhibit high sensitivity towards sulfur oxides contained in the exhaust gas from internal combustion engines. Sulfur oxides, after oxidation to sulfur trioxide on the storage catalyst, react with the storage material to form thermally very stable sulfates and continuously reduce the storage capacity for nitrogen oxides.

As an alternative to nitrogen oxide storage catalysts, catalysts have been developed which have a higher selectivity than conventional catalysts during the reaction of nitrogen oxides with hydrocarbons in an oxygen-rich exhaust gas. These include, for example, catalysts based on zeolites exchanged with copper or iron or iridium-containing catalysts. These catalysts enable permanent conversion of nitrogen oxides even in lean exhaust gases.

The activity of reduction catalysts generally depends on the oxygen concentration of the exhaust gas and on the temperature of the exhaust gas. Thus, Chajar et al. reported, in Catalysis Letters 28 (1994), 33–40, that a Cu-ZSM5 catalyst displays its optimum reduction activity with about 0.5 vol. % of oxygen in the exhaust gas, that is under slightly sub-stoichiometric conditions. If there is no oxygen in the exhaust gas, the conversion of NO on this catalyst is between 2% (at 250° C.) and 8% (at 500° C.), depending on the temperature of the exhaust gas.

In addition to depending on the oxygen concentration of the exhaust gas, reduction catalysts also exhibit a pronounced temperature dependence with regard to the conversion of nitrogen oxides. The light-off temperature for the reaction of nitrogen oxides in an oxygen-rich exhaust gas is about 350° C. The light-off temperature is understood to be the temperature at which the rate of conversion of a harmful substance reaches a specific value, usually 50%. As the exhaust gas temperature increases beyond this point, the conversion rate for nitrogen oxides initially increases, passes through a maximum at a specific temperature and then decreases again to almost zero at exhaust gas temperatures above 500° C.

Lean-burn gasoline engines, and in particular diesel engines, often achieve exhaust gas temperatures of less than 350° C. when operating under part loads. Therefore catalysts are required which develop their maximum rates of conversion at the lowest possible exhaust gas temperatures of less than 350° C., preferably less than 300° C.

EP 0 633 052 B1 describes a catalyst for the conversion of nitrogen oxides in oxygen-rich exhaust gases which consist of a crystalline iridium silicate with a Si/Ir atomic ratio of 50 to 800 and a Si/Al ratio of not less than 15. With an oxygen concentration of 3.5 vol. % in the exhaust gas, the maximum rates of conversion for this catalyst occur at exhaust gas temperatures of at least 430° C. and thus are not very suitable for the case described above. As a result of the method of preparation chosen for this catalyst, a defined compound of silicate and iridium is present, which leads to very homogeneous and atomic distribution of the iridium in this compound.

EP 0 832 688 A1 describes a catalyst which contains iridium, sulfur and optionally platinum as catalytically active substances. In this catalyst, iridium and sulfur can be applied to a common support material such as, for example, aluminum oxide. Alternatively, a metal sulfate may also be used as a support for the iridium. After impregnating the support material with iridium chloride, the material is dried and calcined at 500° C., so that the iridium is present as very fine particles on the support material. The catalyst is used to remove nitrogen oxides from oxidizing exhaust gases.

DE 196 19 791 A1 describes a catalyst which contains iridium, an alkali metal and at least one metal carbide and/or metal nitride as support. In that document, iridium and the alkali metal are applied to the support, for example, by simultaneous impregnation of the support material with soluble precursor compounds of iridium and the alkali metal. With an air/fuel ratio of 23, the temperature for maximum conversion of nitrogen oxides with this catalyst is about 350° C.

JP 07080315 A1 also discloses a catalyst for removing nitrogen oxides from oxidizing exhaust gases from lean-burn engines and diesel engines. The catalyst contains iridium as active component on a support material. The support materials used include, inter alia, silicon dioxide and X, Y, A, ZSM-5 zeolites, mordenite and sillimanite.

An object of the present invention is to provide a catalyst for the reduction of nitrogen oxides which is distinguished by a maximum for the conversion rate at low exhaust gas temperatures and which also has exceptional resistance to poisoning by sulfur dioxide contained in the exhaust gas.

A further object of the invention is to enable a catalyst to withstand the varying conditions present in a lean-burn engine and to have sufficiently high activity for the reduction of nitrogen oxides both under lean and under rich operation.

SUMMARY OF THE INVENTION

The above and other objects of the invention can be achieved by a catalyst for the reduction of nitrogen oxides in oxidizing and reducing atmospheres which contains iridium on a support material consisting of silicon dioxide or zeolite. The catalyst of the invention is characterized by the fact that the iridium is present on the outer surface of the support material with an average particle size between 5 and 30 nm, preferably between 10 and 25 nm.

Surprisingly, this catalyst has an optimum rate of conversion for nitrogen oxides of more than 70% at very low exhaust gas temperatures of less than 350° C. with an oxygen concentration in the exhaust gas of 8 vol. %. An oxygen concentration of 8 vol. % corresponds roughly to a normalized air/fuel ratio $\lambda$ in the exhaust gas of 1.5. Stoichiometric exhaust gas conditions are present at an oxygen concentration of about 0.7 vol. %.

An important factor relating to the catalyst according to the invention is that iridium is applied to a material which contains a high proportion of silicon dioxide as the support with a relatively coarse particle size of between 10 and 30 nm. Therefore, silicon dioxide itself or a dealuminized zeolite in the acid H-form is used as the support material. A ZSM-5 zeolite with a molar ratio (also called the modulus) of silicon dioxide to aluminum oxide of more than 20, preferably more than 100, is preferably used.

Zeolites are oxidic silicon/aluminum compounds with a specific crystal structure. They have the general composition

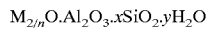

wherein M represents a cation with the valency n and x is the modulus. The modulus is always greater than or equal to 2. The cations M are required to balance the charge in the zeolite lattice. They may be replaced by different ions by an ion exchange procedure. In this case, the new ion occupies the position of the ion being exchanged within the microporous structure of the zeolite. The number of ions which can be incorporated in the zeolite in this way is thus restricted by the ion exchange capacity.

Zeolites are often marketed in their $Na^+$ or $H^+$ form. The theoretical ion exchange capacity of a zeolite correlates directly with the number of anions in the lattice. To increase their hydrothermal stability, zeolites may be dealuminized using special techniques. Depending on the type of zeolite used, zeolites with moduluses of well above 100 may then result. However, the concentration of cations in the zeolite also decreases as the degree of dealuminization increases, since if the aluminum concentration is smaller, a smaller charge compensation effect is also required. Accordingly, the ion exchange capacity decreases drastically in dealuminized zeolites.

BRIEF DESCRIPTION OF DRAWINGS

The invention is explained in more detail by the following figures wherein.

DETAILED DESCRIPTION OF INVENTION

Figure 1:
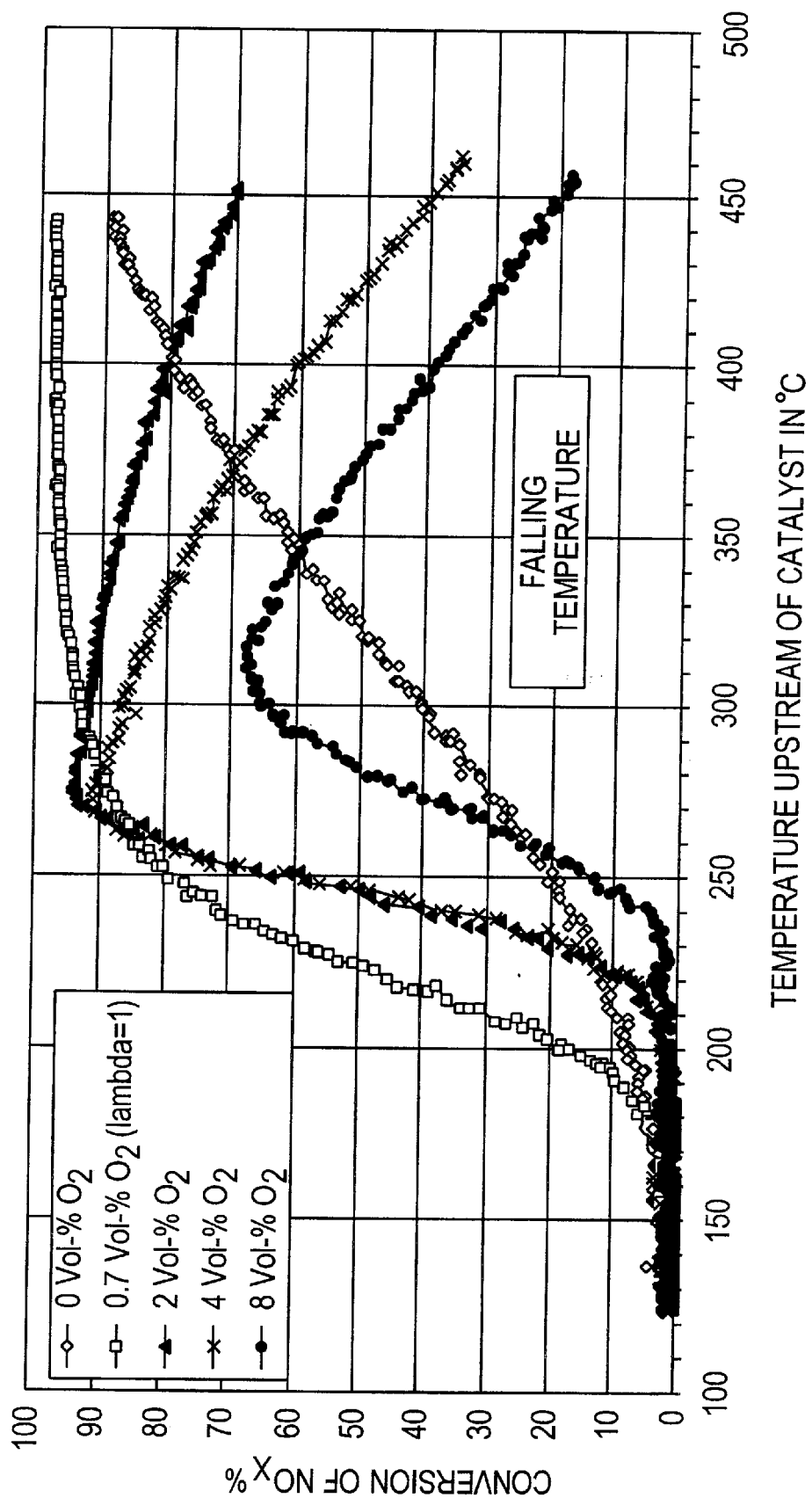
FIG. 1 is a graph showing the change in nitrogen oxide conversion for the catalyst according to example 1 with exhaust gas temperature, for different concentrations of oxygen in the exhaust gas.

The low temperatures for the optimum conversion of nitrogen oxides on catalysts according to the invention were unexpected against the background of EP 0 633 052 B1, since the catalysts consisting of an iridium silicate described in that prior art document had the basic structure of a zeolite. According to that document, the iridium is, for example, incorporated directly into the zeolite during preparation of the zeolite. The zeolite, with its specific surface area, does not therefore act as a support for the iridium crystallites in that case, but forms a chemical compound with the iridium. Iridium is thus distributed very finely in this prior known material at the atomic level.

The present invention pursues a completely different route. Zeolite or silicon dioxide are used as support materials on the outer surface of which the iridium is deposited.

Thus, when providing the zeolites used as support with iridium, the iridium is not incorporated into the lattice of the zeolite and ion exchange is not involved. These techniques would on the one hand obstruct access to the catalytically active iridium for the reactants from the exhaust gas and on the other hand the amounts of iridium with which the zeolite can be provided would be strictly limited due to the small ion exchange capacity of dealuminized zeolite.

According to the present invention, therefore, the catalytically active iridium is deposited on the outer surface of the zeolites by impregnation with, for example, an aqueous solution of soluble precursor compounds of iridium. So-called pore volume impregnation has proved especially advantageous for this purpose. Here, the precursor compounds are dissolved in an amount of water which corresponds to 70 to 100% of the previously determined water absorption capacity. This solution is applied over the zeolite which is being agitated in a tank. The moist powder is dried at an elevated temperature. If the solubility of the precursor compound is not high enough to ensure the requisite extent of loading of the support material with iridium in a single impregnation step, then the material may be impregnated several times.

After drying, the impregnated support material is calcined at 300 to 500° C. for a period of 1 to 4 hours in a reducing atmosphere, preferably under forming gas (5 vol. % $H_2$; 95 vol. % $N_2$), in order to decompose the precursor compounds of iridium.

Surprisingly it has been demonstrated that, in order to produce optimum catalytic activity, the iridium particles do not have to be finely distributed on the surface of the support material, as is conventional in the case of platinum catalysts. Rather, a specific minimum size of particles is required. Optimum activities are produced with average particle sizes between 10 and 30 nm. With average particle sizes of less than 10 nm, the reducing activity of the catalyst is reduced. With decreasing particle size, it then increasingly acts only as an oxidizing catalyst for carbon monoxide and hydrocarbons. Average particle sizes of greater than 50 nm also lead to a reduction in catalytic activity.

It was found that the particle size can be affected by the choice of calcination conditions. In order to obtain particle diameters in the range between 10 and 30 nm, calcination must be performed under reducing conditions. The calcination temperature should be in the range between 300 and 500° C. The optimum calcination conditions can readily be determined by a person skilled in the art by checking the particle diameter produced, using a transmission electron microscope.

Another objective of calcining under reducing conditions is the removal of chlorine from the catalyst, this having been introduced into the catalyst via the preferred precursor compound of iridium, that is iridium chloride. It was found that highly active catalysts are obtained only by calcining in a reducing gas phase. Wet-chemical reduction leads to poor results.

The support materials can be loaded with 0.01 to 5 wt. % of iridium, with respect to the total weight of catalyst, in the way described above. A concentration of less than 0.01 wt. % of iridium in the catalyst is too low for effective conversion of nitrogen oxides. Above 5 wt. %, particle growth increases due to the high concentrations so that the catalytic potential of the iridium can no longer be used to the optimum.

The catalyst is preferably applied in the form of a coating to the wall surfaces of the flow channels in honeycomb structures made of ceramic or metal. These honeycomb structures are routinely used as carrier structures for car exhaust gas catalysts. They have a number of parallel flow channels for the exhaust gas. The number of flow channels per square centimeter of cross-sectional area in the honey-comb structure is called the cell density. The cell density of conventional honeycomb carrier structures is between 10 and 250 $cm^{-2}$. However, other structures such as, for example, open-cell foams may also be used as carrier structures for the catalyst. The catalyst is applied to these carrier structures at concentrations of 30 to 300 grams per liter volume of carrier structure.

To improve adhesion of the catalyst to the carrier structures, other oxidic components such as aluminum oxide, titanium oxide, zirconium oxide or mixtures thereof may be added to it in amounts of up to 50 wt. %, with respect to the total weight of catalyst.

EXAMPLE 1

A ZSM5 zeolite in the H form with a modulus of 300 was chosen to prepare an iridium catalyst on a zeolite and an impregnating solution was made up by boiling 0.92 g of $IrCl_3 \cdot 3H_2O$ under reflux in 100 ml of water for a period of 24 hours.

A quantity of impregnating solution which was just enough to be taken up by the support was added to 50 g of the zeolite. The moist material was dried at 125° C. and impregnation was repeated until all the solution had been applied to the support. The powder obtained in this way was reduced with forming gas (5 vol. % $H_2$; remainder nitrogen) in a reducing oven at 450° C. for a period of 6 hours with a gas flow of 5 Nl/min. The final catalyst contained 1 wt. % of iridium, with respect to its total weight.

The catalyst prepared in this way was homogenized as an aqueous dispersion in a ball mill. Then 36 parts by weight of binder (water glass) were added per 100 parts of catalyst and the dispersion was diluted with water to a solids concentration of 300 g/l.

To coat a cordierite honeycomb structure with a cell density of 62 $cm^{-2}$, this was immersed in the dispersion, then the excess dispersion was blown out of the channels with compressed air and the unit was dried in a drying cabinet. The coated honeycomb structure had a coating concentration of 300 grams per liter of honeycomb structure. The coated honeycomb structure was reduced in forming gas at 450° C. for a period of 6 hours.

EXAMPLE 2

Another catalyst was prepared in the same way as in example 1. A ZSM5 zeolite with a modulus of 27 was used instead of the ZSM5 zeolite with a modulus of 300.

The catalyst was applied to a honeycomb structure in the same way as described in example 1.

EXAMPLE 3

Another catalyst was prepared in the same way as in example 1. Pure silicon dioxide was used instead of the ZSM5 zeolite with a modulus of 300.

The catalyst was applied to a honeycomb structure in the same way as described in example 1.

Application Example

The nitrogen oxide conversions for catalysts from the above examples were determined in a synthesis gas unit as a function of the exhaust gas temperature with different oxygen concentrations in the exhaust gas. A synthetic exhaust gas with a water content of 10 vol. %, a nitrogen oxides concentration of 270 ppm and a propene concentration of 1650 ppm in nitrogen was used for these tests. A space velocity of 51000 $h^{-1}$ was used in the honeycomb structure.

Figure 3:
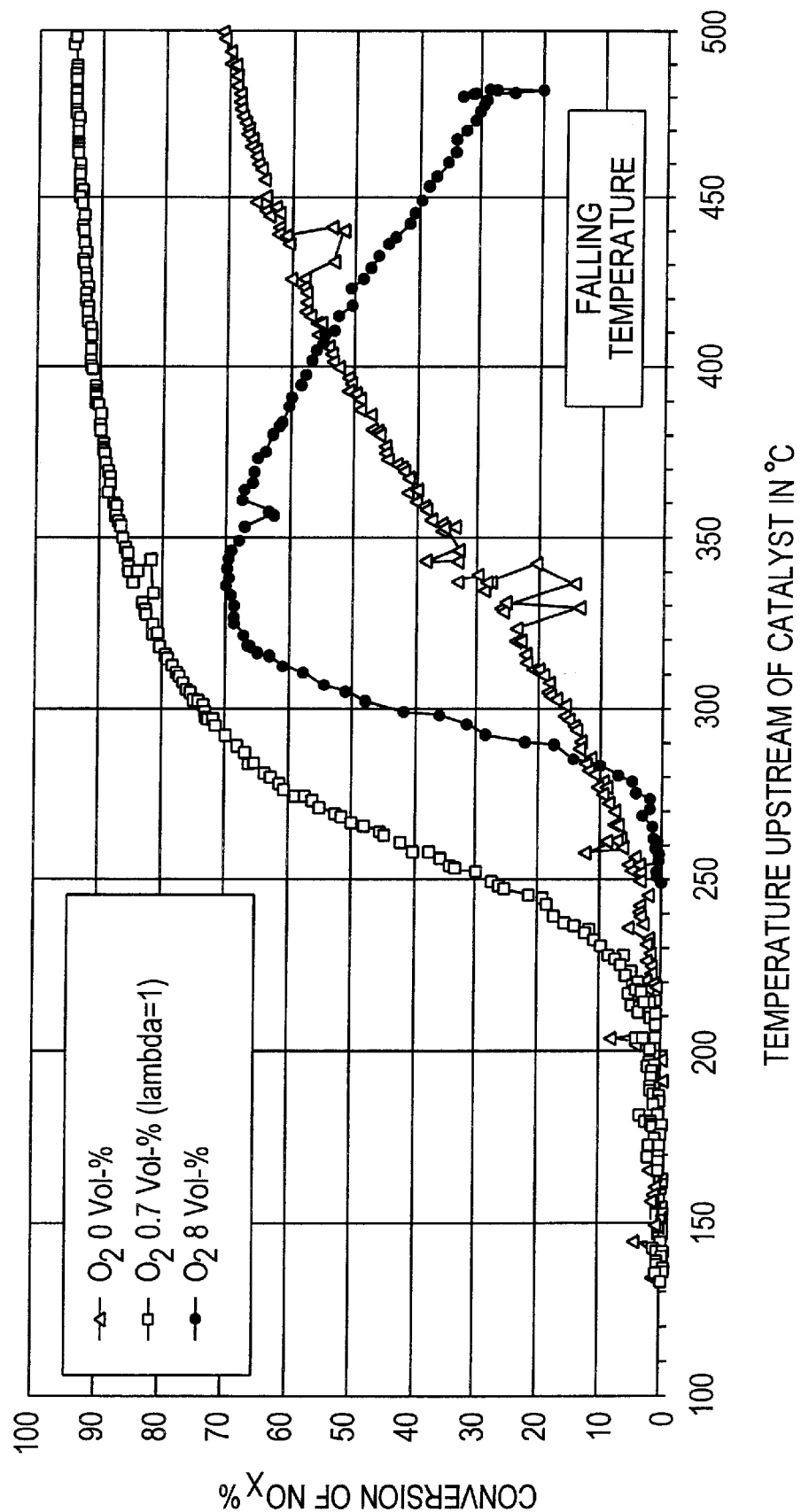
FIG. 3 is a graph showing the change in nitrogen oxide conversion for the catalyst according to example 3 with exhaust gas temperature, for different concentrations of oxygen in the exhaust gas.

FIGS. 1 and 3 show the experimentally measured conversion curves for the catalysts from examples 1 and 3.

With an Ir-ZSM5 catalyst (modulus 300) and an oxygen content of 8 vol. %, corresponding to a normalized air/fuel ratio of about 1.5 (oxidizing conditions), a light-off temperature of 270° C. was observed for a nitrogen oxide conversion of 30% (FIG. 1). The conversion maximum was 65% and was at 320° C. The temperature range within which nitrogen oxide conversions of more than 30% were achieved extended from 270 to 420° C. With an oxygen content of 0.7 vol. %, corresponding to a normalized air/fuel ratio of 1 (stoichiometric conditions), the light-off temperature for a nitrogen oxide conversion of 50% was about 225° C. The nitrogen oxide conversion was more than 90% at temperatures above 275° C.

With an Ir-SiO$_2$ catalyst (FIG. 3) and an oxygen content of 8 vol. %, a light-off temperature of 290° C. was observed for a nitrogen oxide conversion of 30%. The conversion maximum occurred at 340° C. and was 70%. The temperature range within which the nitrogen oxide conversions were more than 30% extended from 290° C. to 480° C. With an oxygen content of 0.7 vol. %, the light-off temperature for a nitrogen oxide conversion of 50% was about 270° C. The nitrogen oxide conversion was greater than 90% at temperatures above 380° C.

Figure 2:
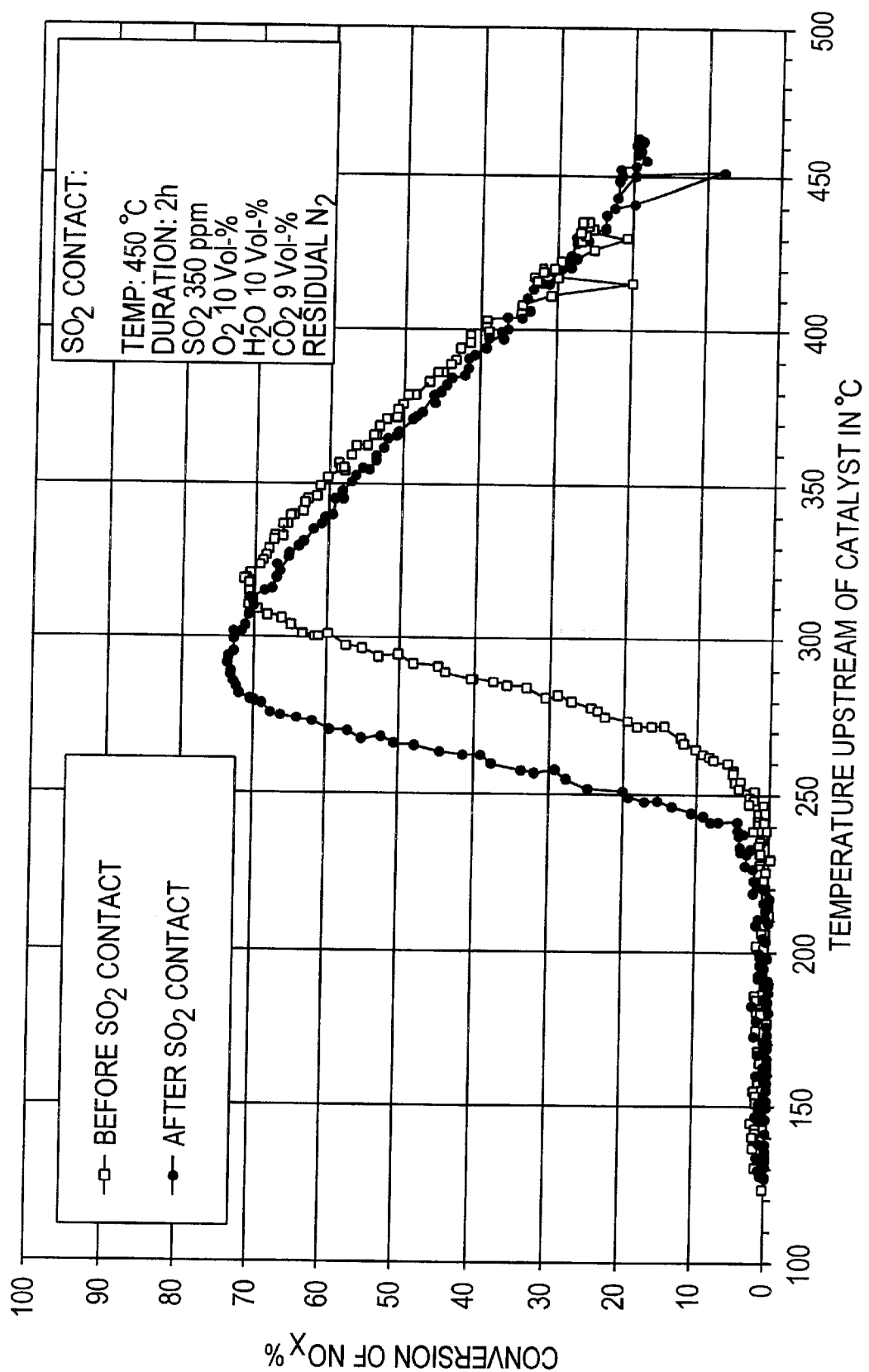
FIG. 2 is a graph showing the change in nitrogen oxide conversion for the catalyst according to example 1 with exhaust gas temperature, before and after contamination with sulfur dioxide.

FIG. 2 shows the effect of sulfur dioxide in the exhaust gas on the catalytic activity of the catalyst from example 1 (Ir-ZSM5 with a modulus of 300). With this catalyst, after loading with 350 vol.-ppm of sulfur dioxide in air for a period of 2 hours at a temperature of 450° C., no deactivation was detected. Rather, a slight shift to lower values for the light-off temperature and the temperature for maximum nitrogen oxide conversion was observed.

Further variations and modifications of the invention will be apparent to those skilled in the art from the foregoing and are intended to be encompassed by the claims appended hereto.

German priority application 198 29 976.1 is relied on and incorporated herein by reference.

We claim:

1. A catalyst structure for reducing nitrogen oxides in both oxidizing and reducing atmospheres, the catalyst structure comprising:
   a honeycomb structure, made of ceramic or metal, having a plurality of flow channels with wall surfaces;
   a catalyst deposited on at least some of the wall surfaces as a coating;
   said catalyst consisting of:
      a support material of silicon dioxide or of zeolite;
      iridium having an average particle size of 10 to 30 nm deposited on external surfaces of the support material; and
      a member selected from the group consisting of aluminum oxide, titanium oxide, zirconium oxide, water glass and mixtures thereof.

2. The catalyst structure according to claim 1, wherein the support material comprises a dealuminized zeolite in acid form.

3. The catalyst structure according to claim 2, wherein the dealuminized zeolite comprises a ZSM5 zeolite having a modulus of more than 20.

4. The catalyst structure according to claim 2, wherein the dealuminized zeolite comprises a ZSM5 zeolite having a modulus of more than 100.

5. The catalyst structure according to claim 1, wherein the iridium is present in an amount of 0.01 to 5 wt % based on the total weight of the catalyst.

6. The catalyst structure according to claim 1, wherein the catalyst is applied, in the form of a coating, to the wall surfaces of the flow channels at a concentration of 30 to 300 g per liter of the honeycomb structure.

7. A process for preparing the catalyst according to claim 1, the process comprising:
   impregnating the support material with a soluble precursor of iridium;
   drying the impregnated support material; and
   calcining the impregnated support material in a hydrogen-containing gas stream, at a temperature between 300 and 500° C., for a period of 1 to 10 hours.

8. A process for treating an exhaust gas stream from a gasoline or a diesel engine to purify the exhaust gas stream, the process comprising contacting the exhaust gas stream with the catalyst according to claim 1.

9. A process for purifying an exhaust gas stream from a gasoline or diesel engine, the process comprising passing the gas stream through the flow channels of the catalyst structure according to claim 1.

* * * * *